United States Patent [19]

Guthery

[11] Patent Number: 5,364,650
[45] Date of Patent: *Nov. 15, 1994

[54] DISINFECTING PRODUCT

[76] Inventor: B. Eugene Guthery, 3851 NE. Ralph Powell Rd., Lee's Summit, Mo. 64063

[*] Notice: The portion of the term of this patent subsequent to Aug. 10, 2010 has been disclaimed.

[21] Appl. No.: 50,975

[22] Filed: Apr. 22, 1993

Related U.S. Application Data

[63] Continuation of Ser. No. 785,772, Oct. 31, 1991, Pat. No. 5,234,703.

[51] Int. Cl.$^5$ ............................................. A23B 4/12
[52] U.S. Cl. .................................... 426/331; 426/532; 426/641; 426/652; 134/25.3; 252/102
[58] Field of Search ......................... 426/331, 652, 335

[56] References Cited

U.S. PATENT DOCUMENTS

| | | |
|---|---|---|
| 2,466,663 | 4/1940 | Russ et al. |
| 2,950,977 | 8/1960 | Silliken et al. |
| 3,867,300 | 2/1975 | Karabinos et al. |
| 4,002,775 | 1/1977 | Kabara |
| 4,067,997 | 1/1978 | Kabara |
| 4,404,040 | 9/1983 | Wang |
| 4,410,442 | 10/1983 | Lucas et al. |
| 4,770,884 | 9/1988 | Hill et al. |
| 4,827,727 | 5/1989 | Caracciolo |
| 4,862,557 | 9/1988 | Clayton et al. |

FOREIGN PATENT DOCUMENTS 1188188 6/1985 Canada.

OTHER PUBLICATIONS

C. E. A. Winslow and E. E. Lochridge; "The Toxic Effect of Certain Acids Upon Typhoid and Colon Bacilli in Relation to the Degree of Their Dissociation"; *Jo. of Infectious Disease*, 3, 1906, pp. 547–571.

Arnold H. Eggerth; "The Effect of the pH on the Germicidal Actin of Soaps"; *Journal of General Physiology*, 1926, pp. 147–160.

Arnold H. Eggerth; "The Germicidal Action of Hydroxy Soaps"; *Journal of Experimental Medicine*, vol. 50/3, Sep. 1929, pp. 299–313.

James D. Reid; "The Disinfectant Action of Certain Organic Acids"; *Am. Jo. Hygiene*, vol. 16, 1932, pp. 540–556.

Milward Bayliss; "Effect of the Chemical Constitution of Soaps Upon Their Germicidal Properties"; *Jo. Bact.*, vol. 31, 1936, pp. 489–504.

C. Hoffman, T. R. Schweitzer and G. Dalby; "Fungistatic Properties of the Fatty Acids and Possible Biochemical Significance"; *Food Research*, vol. 4, 1939, pp. 539–545.

A. S. Levine and C. R. Fellers; "Action of Acetic Acid on Food Spoilage Microorganisms"; *Journal of Bacteriology*, vol. 39, 1940, pp. 499–515.

A. S. Levine and C. R. Fellers; "Inhibiting Effect of Acetic Acid Upon Microorganisms in the Presence of Sodium Chloride and Sucrose"; *Jo. Bacteriology*, vol. 40, 1940, pp. 255–269.

T. D. Nunheimer and F. W. Fabian; "Influence of Organic Acids, Sugars, and Sodium Chloride upon Strains of Food Poisoning Staphylococci"; *American Journal of Public Health*, vol. 30, Sep. 1940, pp. 1040–1049.

Philip B. Cowles; "The Germicidal Action of the Hydrogen Ion and of the Lower Fatty Acids"; *Yale Jo. of Biology and Medicine*, vol. 13, 1941, pp. 571–578.

A. W. Ralston and C. W. Hoerr; "The Solubilities of the Normal Saturated Fatty Acids"; *Jo. of Organic Chemistry*, vol. 7, 1942, pp. 546–555.

C. A. Shillinglaw and Max Levine; "Effect of acids and Sugar on Viability of Escherichia Coli and Eberthella Typhosa"; *Food Research*, 8, 1943, pp. 464–476.

Cora Rust Owen; "Acetic Acid Inhibition of Gram-Negative Bacilli in Culture Media"; *Journal of Bacteriology*, vol. 52, 1946, pp. 353–356.

Edmund L. Keeney; "Sodium Caprylate, A New and Effective Treatment for Moniliasis of the Skin and Mucous Membranes"; *Bulletin of John Hopkins University Hospital*, vol. 78, 1946, pp. 333–339.

Frederick H. Theodore; "Use of Sodium Propionate in External Infections of the Eyes"; *JAMA*, vol. 143, No. 3, pp. 226–228, May, 1950.

Donald M. Pillsbury and Gerbert Rebell; "The Bacterial Flora of the Skin, Factors Influencing the Growth of Resident and Transient Organisms"; *The Journal of Investigative Dermatology*, vol. 18, 1952, pp. 173–186.

C. Nieman; "Influence of Trace Amounts of Fatty Acids on the Growth of Microorganisms"; *Bact. Reviews*, 18, 1954, pp. 147–163.

Norman O. V. Sonntag; "Utilization of Fatty Acids and Derivatives"; *Fatty Acids*, Book 5, pp. 2703–2774, Interscience Publishers, Inc., New York, New York, 1960.

Gavern T. Walker; "The pH of the Skin"; *Drug and Cosmetic Industry*, Nov. 1961, 89, 5, pp. 585, 634.

J. M. S. Dixon and F. E. Pooley; "The Effect of Chlorination on Chicken Carcasses Infected with Salmonellae"; *J. Hyg., Camb.* 39, 1961, pp. 343–348.

Pieter M. Lategan and Reese H. Vaughn; "The Influ- (List continued on next page.)

*Primary Examiner*—Carolyn Paden
*Attorney, Agent, or Firm*—Litman, McMahon & Brown

[57] ABSTRACT

A method and composition for eradicating bacteria from animal carcasses. The composition comprises a solution coating aliphatic medium chain fatty acids, a chelating agent, enough hydrochloric acid to maintain the solution at an acid pH and enough water to dilute the solution to an appropriate concentration of fatty acids. Animal carcasses to be treated are baptized in the solution for ten to thirty minutes, removed and rinsed. Animal carcasses may also be treated by spraying the solution on the carcasses to be treated. When the solution is to be sprayed on a carcass, a thickener such as a polysaccharide is added to the solution such that the spray solution sticks or holds onto the treated carcass.

13 Claims, No Drawings

OTHER PUBLICATIONS ence of Chemical Additives on the Heat Resistance of *Salmonella typhimurium* in Liquid Whole Egg"; *Jo. Food Science*, vol. 44, 1964, pp. 339–344.

G. J. Mountney and J. O'Malley; "Acids as Poultry Meat preservatives"; *Poultry Science*, 44:582, 1965.

J. E. Thompson, G. J. Banwart, D. H. Sanders and A. J. Mercuri; "Effect of Chlorine, Antibiotics, B-Propiolactone, Acids and Washing on *Salmonella typhimurium* on Eviscerated Fryer Chickens"; *Poultry Science*, 46, 1967, pp. 146–151.

A. W. Kotula, G. J. Banwart and J. A. Kinner; "Effect of Postchill Washing on Bacterial Counts of Broiler Chickens"; *Poultry Science*, vol. 46, 1967, pp. 1210–1216.

C. J. Wabeck, D. V. Schwall, G. M. Evancho, J. G. Heck and A. B. Rogers; "Salmonella Reduction, Chlorine Uptake, and Organoleptic Changes in Poultry Treated with Sodium Hypochlorite"; *Poultry Science;* vol. 46, 1967, p. 1333.

C. J. Wabeck, D. V. Schwall, G. M. Evancho, J. G. Heck and A. B. Rogers; "Salmonella and Total Count Reduction in Poultry Treated with Sodium Hypochlorite Solutions"; *Poultry Science*, vol. 47, 1968, pp. 1090–1094.

Louis H. Muschel and Linda Gustafson; "Antibiotic, Detergent, and Complement Sensitivity of *Salmonella typhi* After Ethylenediaminetetraacetic Acid Treatment"; *Journal of Bacteriology*, vol. 95, No. 6, Jun. 1968, pp. 2010–2013.

J. T. Patterson; "Bacterial Flora of Chicken Carcasses Treated with High Concentrations of Chlorine"; *J. Appl. Bact.*, 31, 1968, pp. 544–550.

M. Nakamura and M. J. Zangar; "Effect of Fatty Acids on Shigella"; *Proceedings of the Montana Academy of Sciences*, vol. 28, 1968, pp 51–57.

J. M. Goepfert and R. Hicks; "Effect of Volatile Fatty Acids on Salmonella typhimurium"; *Journal of Bacteriology*, vol. 97, 1969, pp. 956–958.

Mahmood Khan and Michael Katamay; "Antagonistic Effect of Fatty Acids Against Salmonella in Meat and Bone Meal"; *Applied Microbiology*, vol. 17, No. 3, 1969, pp. 402–404.

J. M. Debevere and J. P. Voets; "Influence of Some Preservatives on the Quality of Prepacked Cod Fillets in Relation to the Oxygen Permeability of the Film"; *J. App. Bact.*, 35, pp. 351–356, 1972.

Jon J. Kabara, Dennis M. Swieczkowski, Anthony J. Conley and Joseph P. Truant; "Fatty Acids and Derivatives as Antimicrobial Agents"; *Antimicrobial Agents and Chemotherapy*, vol. 2, Jul. 1972, pp. 23–28.

J. S. Avens and B. F. Miller; "'Pasteurization' of Turkey Carcasses"; *Poultry Science*, vol. 51, 1972, p. 1781.

J. T. Nickerson and A. Sinskey; "Microbiology of Foods and Food Processing"; 1972, pp. 9–13, 122–125, 161–168.

Ernst Freese, Chingju W. Sheu and Enid Galliers; "Function of Lipophilic Acids as Antimicrobial Food Additives"; *Nature*, vol. 241, Feb. 2, 1973, pp. 321–325.

N. A. Cox, A. J. Mercuri, B. J. Juven, J. E. Thomson and V. Chew; "The Effect of Succinic Acid and Heat on the Microbiological Quality of Poultry Meat"; *Poultry Science*, vol. 52, 1973, p. 2015.

J. S. Teotia and B. F. Miller; "Chemical Pasteurization of Poultry Meat"; *Poultry Science*, vol. 52, 1973, p. 2094.

B. J. Juven, N. A. Cox, A. J. Mercuri and J. E. Thompson; "A Hot Acid Treatment for Eliminating Salmonella From Chicken Meat"; *J. Milk Food Technol.*, vol. 37, No. 5, 1974, pp. 237–239.

N. A. Cox, A. J. Mercuri, B. J. Juven, J. E. Thomson and V. Chew; "Evaluation of Succinic Acid and Heat to Improve the Microbiological Quality of Poultry Meat"; *Journal of Food Science*, vol. 39, 1974, pp. 985–987.

Jon J. Kabara; "Lipids as Safe and Effective Antimicrobial Agents for Cosmetics and Pharmaceuticals"; *Cosmetics and Perfumery*, vol. 90, May 1975, pp. 21–25.

Nobuyuki Kato and Isao Shibasaki; "Comparison of Antimicrobial Activities of Fatty Acids and Their Esters"; *J. Ferment. Technol.*, vol. 53, No. 11, 1975, pp. 793–801.

J. E. Thomspon, N. A. Cox and J. S. Bailey; "Chlorine, Acid and Heat Treatments to Eliminate Salmonellae and Improve Shelf-Life of Broiler Carcasses"; *Poultry Science*, vol. 55, 1976, p. 1608.

J. J. Kabara, R. Vrable and M. S. F. Lie Ken Jie; "Antimicrobial Lipids: Natural and Synthetic Fatty Acids and Monoglycerides"; *Lipids*, vol. 12, No. 9, pp. 753–759, 1977.

A. S. Arafa and T. C. Chen; "Ascorbic Acid Dipping as a Means of Extending Shelf Life and Improving Microbial Quality of Cut-Up Broiler Parts"; *Poultry Science*, vol. 57, pp. 99–103, 1977.

M. E. Anderson, R. T. Marshall, W. C. Stringer and H. D. Naumann; "Combined and Individual Effects of Washing and Sanitizing on Bacterial Counts of Meat-A Model System"; *Journal of Food Protection, Oct. 1977, pp. 668–670.*

M. E. Anderson, R. T. Marshall, W. C. Stringer and H. D. Nauman; "Efficacies of Three Sanitizers Under Six Conditions of Applications to Surfaces of Beef"; *Journal of Food Science*, vol. 42, No. 2, 1977, pp. 326–329.

Jon J. Kabara; "Fatty Acids and Derivatives as Antimicrobial Agents-A Review"; *Symposium on the Pharmacological Effect of Lipids*, The American Oil Chemists' Society, Champaign, Ill., pp. 1–14, 1977.

Isao Shibasaki and Nobuyuki Kato; "Combined Effects on Antibacterial Activity of Fatty Acids and Their Esters Against Gram-Negative Bacteria", *Symposium on the Pharmacological Effect of Lipids*, The American Oil Chemists' Society, Champaign, Ill., pp. 15–24, 1978.

Robert B. Hutchison and Lee R. Mores; "Cosmetics"; *Fatty Acids*, Chap. 29, 1979, American Oil Chemists' Society.

H. S. Lillard; "Levels of Chlorine and Chlorine Dioxide of Equivalent Bactericidal Effect in Poultry Processing Water"; *Journal of Food Science*, vol. 44, 1979, pp. 1594–1597.

J. E. Thompson, J. S. Bailey, N. A. Cox, D. A. Posey and M. O. Carson; "Salmonella on Broiler Carcasses as Affected by Fresh Water Input Rate and Chlorination of Chiller Water"; *Journal of Food Protection*, vol. 42, No. 12, Dec. 1979, pp. 954–955.

H. S. Lillard; "Effect on Broiler Carcasses and Water of Treating Chiller Water with Chlorine or Chlorine Dioxide"; *Poultry Science*, 59:1761–1766, 1980.

E. A. Quartey-Papafio, R. T. Marshall and M. E. Anderson; "Short-Chain Fatty Acids as Sanitizers for Beef"; *Journal of Food Protection*, vol. 43, Mar. 1980, pp. 168–171.

M. E. Anderson, R. T. Marshall, W. C. Stringer and H.

(List continued on next page.)

OTHER PUBLICATIONS

D. Naumann; "In-Plant Evaluation of a Prototype Carcass Cleaning and Sanitizing Unit"; *Journal of Food Protection*, vol. 43, Jul. 1980, pp. 568–570.

The International Commission on Microbiological Specifications for Foods; "pH and Acidity"; *Microbial Ecology of Foods, Factors Affecting Life and Death of Microorganisms*, vol. 1, 1980, Chap. 5, pp. 92–111.

T. J. Humphrey; "The Effects of pH and Levels of Organic Matter on the Death Rates of Salmonellas in Chicken Scald-tank Water"; *Journal of Applied Bacteriology*, 51, 1981, pp. 27–39.

T. J. Humphrey, D. G. Lanning and D. Beresford; "The Effect of pH Adjustment on the Microbiology of Chicken Scald-tank Water with Particular Reference to the Death Rate of Salmonellas"; *Journal of Applied Bacteriology*, vol. 51, 1981, pp. 517–527.

Dolores Kenney, Part I; John J. Kabara, Part II; "Cosmetic Formulas Preserved with Food-Grade Chemicals"; *Cosmetics & Toiletries*, vol. 97, Nov. 1982, pp. 71–84.

F. F. Busta and P. M. Foegeding; "Chemical Food Preservatives"; *Disinfection, Preservation, Sterility*, 3rd Edition, 1983, pp. 656–694.

Stephanie Doores; "Organic Acids"; *Antimicrobials in Foods*, 1983, pp. 75–108.

Jon J. Kabara; "Medium-Chain Fatty Acids and Esters"; *Antimicrobials in Food*, Marcel Dekken, Inc. N.Y., 1983, pp. 109–140.

P. Michael Davidson, Laurie S. Post, Alfred Larry Branen, and Alan R. McCurdy; "Naturally Occurring and Miscellaneous Food Antimicrobials"; *Antimicrobials in Foods*, 1983, pp. 371–397.

G. P. Thiessen, W. R. Usborne and H. L. Orr; "The Efficacy of Chlorine Dioxide in Controlling Salmonella Contamination and Its Effects on Products Quality of Chicken Broiler Carcasses"; *Poultry Science*, 63:647–653, 1984.

T. J. Humphrey, D. G. Lanning and Denise Leeper; "The influence of scald water pH on the death rates of *Salmonella typhimurium* and other bacteria attached to chicken skin"; Journal of Applied Bacteriology, 57, pp. 355–359, 1984.

M. F. Bell, R. T. Marshall and M. E. Anderson; "Microbiological and Sensory Tests of Beef Treated with Acetic and Formic Acids"; *Journal of Food Protection*, vol. 49, Mar. 1986, pp. 207–210.

Anita J. Okrend, Ralph W. Johnston and Alice B. Moran; "Effect of Acetic Acid on the Death Rates at 52° C. of *Salmonella newport, Salmonella typhimurium* and *Campylobacter jejuni* in poultry Scald Water"; *Journal of Food Protection*, vol. 49, No. 7, Jul. 1986 pp. 500–0.

"antimicrobial Agents, A Means toward Product Stability"; *Food Technology*, Sep. 1986, pp.104–111. 3138 H. S. Lillard, L. C. Blankenship, J. A. Dickens, S. E. Craven and A. D. Shackelford; "Effect of Acetic Acid on the Microbiological Quality of Scalded Picked and Unpicked Broiler Carcasses"; *Journal of Food Protection*, vol. 50, No. 2, Feb. 1987, pp. 112–114.

Iman W. Koster and Albertus Cramer; "Inhibition of Methanogenesis from Acetate in Granular Sludge by Long-Chain Fatty Acids"; *Applied and Environmental Microbiology*, vol. 53, No. 2, Feb. 1987, pp. 403–409.

J. Stan Bailey; "Symposium: Status and Prospectus for Control of Salmonella Contamination of Poultry"; *Poultry Science*, 67:920, 1988.

A. L. Izat, M. Colberg, M. H. Adams, M. A. Reiber and P. W. Waldroup; "Production and Processing Studies to Reduce the Incidence of Salmonellae on Commercial Broilers"; *Journal of Food Protection*; vol. 52, No. 9, pp. 670–673, Sep. 1989.

Jennifer L. Johnson, Michael P. Doyle and Robert C. Cassens; "*listeria monocytogenes* and Other *Listeria* spp. in Meat and Meat Products, A Review"; *Journal of Food Protection*, vol. 53, No. 1, Jan. 1990, pp. 81–91.

J. Marsden and J. Hodges; "Petition and Supporting Data to Authorize Offensive Control System for Bacterial Control of Beef Carcasses"; May 1990, Draft 2, pp. 1–25.

Mario E. Villarreal, Robert C. Baker and Joe M. Regenstein; "The Incidence of Salmonella on Poultry Carcasses Following the Use of Slow Release Chlorine Dioxide (Alcide)"; *Journal of Food Protection*, vol. 53, No. 6, Jun. 1990, pp. 465–467.

A. Pedrosa-Menabrito and J. M. Regenstein; "Shelf-life Extension of Fresh Fish-A Review, Part II—Preservation of Fish"; *Journal of Food Quality*, vol. 13, 1990, pp. 129–146.

A. L. Izat, M. Colberg, R. A. Thomas, M. H. Adams and C. D. Driggers; "Effects of Lactic Acid in Processing Waters on the incidence of Salmonellae on Broilers"; *Journal of Food Quality*, vol. 13, 1990, pp. 295–306.

M. E. Anderson and R. T. Marshall; "Reducing Microbial Populations on Beef Tissues: Concentration and Temperature of an Acid Mixture"; *Journal of Food Science*, vol. 55, No. 4, 1990, pp. 903–905.

L. C. Blankenship, B. G. Lyon and C. E. Lyon; "Efficacy of Acid Treatment Plus Freezing to destroy Salmonella Contaminants of Spice-Coated Chicken Fajita Meat"; *Poultry Science*, PSA and SPSS Abstracts vol. 69, Sup. 1990, p. 20.

M. H. Adams, M. Colberg, R. E. Hierholzer, J. M. Kopek, J. P. McGinnis, M . A. Reiber and A. L. Izat; "Effects of Various Chill Water Treatment on Incidence and Levels of Salmonellae on Processed Carcasses"; Poultry Science, PSA and SPSS Abstracts, vol. 69, Sup. 1990 p. 152.

DISINFECTING PRODUCT CROSS REFERENCE TO RELATED APPLICATION

The present application is a continuation of U.S. patent application Ser. No. 07/785,772, now U.S. Pat. No. 5,234,703.

BACKGROUND OF THE INVENTION

The present invention relates generally to compositions and methods for disinfecting the surface of animal carcasses and in particular to a composition and method including certain fatty acids to kill enteric pathogens and spoilage organisms located on the surface of animal carcasses.

Bacterial contamination of animal carcasses continues to be a major problem in the meat processing industry. Enteric pathogens and spoilage organisms such as Salmonella, Campylobacter, Listeria, Pseudomonas and Enterobacteracae seem to be omnipresent particularly Salmonella and Campylobacter in the poultry environment. These bacteria appear to adapt to changes in the environment and have survived numerous improvements in sanitation, antibacterial drugs and other chemical treatments.

Authorities differ in opinion as to how and when carcasses become contaminated with the Salmonella bacteria. Some authorities argue that the Salmonella bacteria is on the skin of most of the chickens entering processing facilities. They further argue that little cross contamination of the carcasses occurs during processing due to existing sanitizing practices. However, existing sanitizing practices do not effectively reduce or eliminate the Salmonella bacteria already on the chickens, especially bacteria that are in pores or other protected areas on the skin. These protected bacteria are spread about the chicken carcasses during processing, so most of the carcasses leaving the processing facility are still contaminated with these pathogens.

Others argue that the Salmonella bacteria is attached to relatively few of the chickens entering processing facilities and most of the carcasses are cross contaminated with the Salmonella bacteria during processing. For example, Salmonella may be transferred from the excrement of one carcass to the feathers of another while in a poultry transport container.

In order to reveal the numerous possibilities for Salmonella contamination in the processing of poultry, the various steps of the process are briefly set forth. Usually, the process begins with the slaughtering of a chicken and then immersion of the carcass into a scald tank. The scald tank temperature is from about 50 to 60 degrees Centigrade. The carcass is then plucked and eviscerated.

The carcass is then placed into a chiller tank. The United States Department of Agriculture (USDA) Safety and Quality Service regulations require that the chicken carcasses be cooled to below 40 degrees Fahrenheit within four hours after slaughter, that two quarts of water must flow from a chiller tank for each chicken carcass cooled. The carcasses must not gain more than eight percent water weight during the entire procedure. Other requirements exist for different types of poultry such as turkeys, and are typically dependent upon the size of the animal. Chillers used in the cooling process normally use cold water or a water and ice slush to remove animal heat from carcasses. Cooling water in the chill tank is maintained at approximately 34 degrees Fahrenheit (F.). The carcasses are typically tumbled through the chiller and in the process blood, lipid, dirt, bacteria and other particulate matter wash off the carcass and become suspended in the chiller water.

It has been suggested that various organic acids, such as acetic and lactic be added to the scald tank in an attempt to disinfect the carcasses. Chlorine has been added to both the scald tank and the chiller tank for this purpose. Although these tactics may be successful in reducing or eliminating cross contamination, none of these treatments have been completely successful in eradicating Salmonella on the chicken. Many of the acid treatments are successful in high concentration to kill Salmonella but such high concentrations adversely affect the organoleptic appearance of the carcass or render the skin easily bruised and damaged during the remainder of the processing procedure.

It has previously been shown in certain industrial and commercial applications that certain fatty acids have an inhibitory or bacteriocidal effect on certain bacterial species. In particular, mixtures of fatty acids have been utilized for sanitizing processing facilities, such as pipelines; however, the literature does not disclose direct use on animals or animal carcasses. Furthermore, not all fatty acids or compositions containing various mixtures thereof would be acceptable for use on animal carcasses. Certain short chain fatty acids having from about 4 to 7 carbon atoms have a particularly rancid, obnoxious odor, making them unacceptable if used in high concentrations. The low water solubility and surface tension of fatty acids also poses a difficulty in preparing sanitizing solutions having fatty acids dissolved therein.

SUMMARY OF THE INVENTION

The present invention comprises novel compositions and methods for controlling enteric pathogens and spoilage organisms such as Salmonella, Campylobacter, Listeria, Pseudomonas and Enterobacteracae on the surface of meat products, particularly poultry. In general, the compositions comprise aqueous solutions having an effective concentration of a fatty acid or mixture of fatty acids having about eight to twelve carbon atoms.

In one embodiment of the present invention, poultry carcasses are immersed in a diluted fatty acid sanitizing solution. A sanitizing solution concentrate further includes a solubilizing acid, such as acetic acid to maintain the fatty acids in solution. The sanitizing solution also includes a sufficient amount of buffering acid such as hydrochloric acid to maintain the solution at an acidic pH, preferably at a pH from about 2.0 to 4.0. The sanitizing solution also preferably includes an effective amount of citric acid to increase the antibacterial activity of the fatty acids with respect to Gram-negative bacteria such as Salmonella, Pseudomonas, Listeria, Campylobacter and Enterobacteracae.

During processing of the chicken carcasses, the carcasses are immersed into a tank containing a quantity of the sanitizing solution. The sanitizing solution is preferably agitated to increase the efficacy of the solution and the speed in which the solution kills the bacteria attached to the poultry carcass. Agitation may be through aeration by bubbling air through the solution or by mechanical means, such as strainers, paddles, brushes or pump driven liquid jets. The sanitizing solution may also be heated to increase the efficacy of the solution in killing bacteria. It is preferable that each carcass be immersed in the sanitizing solution after the carcass is eviscerated and before the carcass is placed in a chiller tank.

In an alternative embodiment of the present invention, the carcasses are sprayed with a fatty acid spray solution. The spray solution preferably includes a sufficient amount of buffering acid such as hydrochloric acid to maintain the solution at an acidic pH, preferably at a pH from about 2.0 to 4.0. The spray solution also preferably includes an effective amount of citric acid to increase the antibacterial activity of the fatty acids with respect to Gram-negative bacteria such as Salmonella, Campylobacter, Listeria, Enterobacteracae and Pseudomonas. An emulsion is made, by mechanical agitation, of the fatty acids in the solution to be sprayed. The spray solution also preferably includes an effective amount of a polysaccharide such as xanthan gum, alginic acid or the thickener sold under the trademark Carbopol to stabilize the fatty acid emulsion and to act as a thickening agent. The polysaccharide thickens the spray solution and generally prevents the spray solution from simply running off the chicken carcass upon application.

During application of the spray solution on carcasses, the surface of the carcasses are preferably agitated. Agitation may be by physical scrubbing of the carcasses, through the action of the spray solution under pressure or by other means. The agitation increases the efficacy of the spray solution in killing bacteria, perhaps due to better exposure of the solution into crevasses containing bacteria. The spray solution may also be heated to increase its efficacy. If the spray solution is to be heated, spraying should occur after plucking and prior to immersion in the chiller. After a sufficient amount of time to kill the bacteria on the carcasses, the spray solution may be rinsed off the chicken carcasses.

OBJECTS AND ADVANTAGES OF THE INVENTION

Therefore, the objects of the present invention are: to provide improved compositions and methods for treating poultry and other animal carcasses to eradicate Salmonella and other bacteria from the carcass surface; to provide such a composition and method for use on carcasses including poultry, pork, beef, turkey, lamb, fish and other seafood; to provide such compositions that may be utilized to dip or spray the carcass to be disinfected; to provide such compositions and methods that do not adversely affect organoleptic qualities such as the taste, texture and appearance of food products produced from the treated carcass; to provide such compositions and methods which will readily meet Federal regulatory requirements for food processing; to provide such compositions and methods that quickly and effectively eradicate Salmonella, Campylobacter, Listeria, Enterobacteracae and Pseudomonas and other bacteria from processed carcasses; to provide such compositions and methods that are relatively easy and inexpensive to prepare and to use and are particularly well adapted for their intended usages thereof.

Other objects and advantages of this invention will become apparent from the following description wherein is set forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific composition and functional details disclosed herein are not to be interpreted as limiting, but merely as a basis for the claims and as a representative basis for teaching one skilled in the art to variously employ the present invention in virtually any appropriately detailed form.

The present invention comprises novel compositions and methods for controlling Salmonella, Campylobacter, Listeria, Enterobacteracae and Pseudomonas bacteria on the surface of meat carcasses, particularly poultry. In general, the compositions comprise aqueous bacteriocidal solutions having an effective concentration of a fatty acid or mixture of fatty acids that are edible by humans in the concentrations found on the carcasses subsequent to treatment. The preferred fatty acids are those having from six to twelve carbon atoms and are hereinafter generally referred to as medium chain fatty acids. The fatty acids may also be classified as monobasic acids.

A preferred embodiment of the present invention is used as a bacterial sanitizing solution wherein poultry carcasses are immersed in an aerated tumble tank containing the bacteriocidal sanitizing solution. The sanitizing solution generally comprises water, an effective amount of a medium chain fatty acid or mixtures thereof, a sufficient amount of a buffering acid, such as hydrochloric acid, to maintain the pH of the solution between 2.0 and 4.0, and an effective amount of a chelating agent such as citric acid to increase the bacteriocidal action of the medium chain fatty acids.

The preferred medium chain fatty acids comprise caprylic acid having eight carbon atoms per molecule and capric acid having ten carbon atoms per molecule. Caprylic acid and capric acid are preferably used in a ratio of sixty percent by weight caprylic acid to forty percent by weight capric acid for the total medium chain fatty acid content.

Although the medium chain fatty acids have low solubilities in water, the concentration of medium chain fatty acids used in the sanitizing solution is small enough that the medium chain fatty acids will be dissolved in the water such that a surfactant is not required. However, it would be preferable to sell and distribute the sanitizing solution in a concentrated form wherein a user would dilute the concentrated sanitizing solution in water to prepare the final, usable sanitizing solution. In a concentrated form, the concentration of the medium chain fatty acids with respect to the amount of water present would be such that the medium chain fatty acids would not remain in solution. Therefore an effective amount of a solubilizing short chain carboxylic acid such as acetic acid may be added to the concentrated sanitizing solution to maintain the medium chain fatty acids in solution.

It is hypothesized that the lethal effect of the sanitizing solution on Salmonella and other enteric pathogens and spoilage organisms is a function of both the hydrogen ion concentration of the low pH solution and of the antimicrobial effect of the fatty acids in the solution. Salmonella is classified as a Gram-negative bacteria. Although fatty acids by themselves are effective in eradicating Gram-positive bacteria, they are not effective by themselves in eradicating Gram-negative bacteria at neutral pH. However, the efficacy of the antimicrobial effect of fatty acids against Gram-negative bacteria such as Salmonella is greatly enhanced by lowering the pH and using the fatty acid with a chelating agent such as citric acid. Other effective chelating agents include polyphosphoric acid and ethylenediaminetetraacetic acid (EDTA).

Propionic acid which exhibits a bacteriocidal effect is highly soluble in water. Therefore, an effective amount of propionic acid may be added to the sanitizing solution to eradicate enteric pathogens and spoilage organisms in the aqueous phase wherein the aqueous phase comprises an aqueous layer typically found on poultry carcasses during processing. The aqueous phase may also comprise the sanitizing solution itself such that propionic acid prevents cross-transfer of bacteria from carcass to carcass while the carcasses are immersed in the sanitizing solution.

Carcasses to be treated are immersed, dipped or submerged in a tank containing the sanitizing solution. Poultry carcasses are preferably immersed in the sanitizing solution after scalding, plucking and evisceration and prior to chilling in a chill tank.

In using the sanitizing solution, the following operating parameters or design considerations can be used to meet process objectives and industry regulations; concentration of the dipping solution, temperature of the sanitizing solution and retention time of carcasses in the sanitizing solution. The primary objective in using the sanitizing solution is to eradicate bacteria from carcasses during processing. This primary objective must be balanced against the objectives of minimizing costs and minimizing damage to the carcass. The process must also meet Federal regulations which provide that carcasses gain no more than eight percent water weight during processing and regulations restricting the heating of carcasses during processing. Increasing the concentration and temperature of the sanitizing solution and increasing the length of time the carcasses are contacted with the sanitizing solution increases the effectiveness of the sanitizing solution in eradicating bacteria. However, increasing each of these parameters also increases costs, carcass damage and percent water gain thus requiring optimization of these parameters.

The concentration of medium chain fatty acids in the sanitizing solution is preferably 50 to 1500 parts per million (ppm). The concentration of citric acid in the sanitizing solution is preferably 100 to 3000 ppm and the concentrations of acetic acid and propionic acid in the sanitizing solution are preferably in the range of 100 to 20,000 ppm and 100 to 1000 ppm respectively. The temperature of the sanitizing solution is preferably elevated over 50 degrees F., and at least over 75 degrees F. Fahrenheit. However, the temperature of the sanitizing solution should not exceed the temperature of the poultry carcasses immediately after scalding, plucking and evisceration which generally ranges from 98° to 100° F. In using the sanitizing solution to treat pork carcasses, it is foreseeable that the sanitizing solution could be heated up to 150 degrees F. Poultry carcasses are preferably immersed in the sanitizing solution for at least five minutes and generally no longer than 30 minutes.

The sanitizing solution is preferably aerated or agitated during use in the tank. The sanitizing solution may be agitated through the use of ultrasound, paddles, brushes or other physical means. Aeration may be by bubbling or by other methods well known in the art.

Hypochlorous acid may be added to the chill tank and sanitizing tank to provide a secondary bacteriocide. The efficacy of hypochlorous acid as a bacteriocide increases with decreasing pH. It is theorized that the low pH of any sanitizing solution remaining on the chicken carcasses when immersed in the chill tank would increase the efficacy of the hypochlorous acid as a bacteriocide.

It is foreseeable that alpha hydroxy substituted fatty acids such as alpha hydroxy caprylic acid may be used instead of or in combination with aliphatic medium chain fatty acids. It is also foreseeable that the sanitizing solution may include a bacteriocidal effective amount of one or more dibasic acids such as oxalic acid, succinic acid and malic acid.

An alternative embodiment of the present invention is used as a spray solution wherein meat, such as poultry carcasses, are sprayed with the spray solution. The spray solution generally comprises water, an effective amount of a fatty acid or mixtures thereof, a sufficient amount of a buffering acid, such as hydrochloric acid, to maintain the pH of the solution between 2.0 and 4.0, an effective amount of a chelating agent such as citric acid to increase the bacteriocidal action of the fatty acids and a sufficient amount of a thickener to allow the spray solution to stick to or hold on to the carcass on which it is applied.

As with the sanitizing solution used with immersion, the preferred medium chain fatty acids in the spray solution are caprylic acid and capric acid in a ratio of sixty to forty parts by weight. The preferred chelating agent is citric acid but may include polyphosphoric acid and ethylenediaminetetraacetic acid (EDTA). Polysaccharides may be used as a thickener or binding agent and the preferred thickener is xanthan gum. Other thickeners that may be used include alginic acid and the thickener sold under the trademark Carbopol. The components of the spray solution are combined to form an emulsion and then sprayed on carcasses. The spray solution is allowed to remain on the carcass a predetermined length of time and then rinsed off with water.

The following examples are provided for the purpose of illustrating the present invention and are not intended to be limiting upon the scope of the invention.

EXAMPLE #1

Tests were conducted to determine the bacteriocidal activity of five different fatty acid solutions against in vitro *Salmonella typhimurium*. The first or C3 solution consisted of 40 grams acetic acid, 20 grams propionic acid, 10 grams citric acid, 5 grams hydrochloric acid and 25 grams water. The second or C6 solution consisted of 40 grams acetic acid, 20 grams caproic acid, 10 grams citric acid, 5 grams hydrochloric acid and 25 grams water. The third or C3-C8 solution consisted of 40 grams acetic acid, 20 grams propionic acid, 10 grams caprylic acid (eight carbon atoms), 10 grams citric acid, 5 grams hydrochloric acid and 25 grams water. The fourth or C3-C8-C10 solution consisted of 35 grams acetic acid, 5 grams propionic acid, 6 grams caprylic acid, 4 grams capric acid (ten carbon atoms), 10 grams citric acid, 5 grams hydrochloric acid, 5 grams DDBSA(dodecylbenzenesulfonic acid) and 30 grams water. The fifth or C8-C10 solution consisted of 40 grams acetic acid, 6 grams caprylic acid, 4 grams capric acid, 10 grams citric acid, 5 grams hydrochloric acid, 5 grams DDBSA and 30 grams water.

The bacteriocidal activity of these solutions was tested using the Germicidal and Detergent Sanitizer Test procedure presented in the *Official Methods of Analysis of the AOAC*, Fourteenth Edition, Chapter 4, Disinfectants paragraphs 4.020–4.029, which was modified by plating, one replicate sample after a 30 second exposure rather than duplicate samples after 30 and 60 seconds. The inoculum employed was Salmonella typhimurium ATCC No. 6539. The sanitizing solutions were tested at dilutions of 1:2000. All dilutions were prepared in AOAC Synthetic Hard Water, 400 ppm as calcium carbonate. The results are summarized in Table #1.

TABLE #1

| Solution | Percent Kill After 30 Second Exposure |
| --- | --- |
| C3 | >99.999 |
| C6 | >99.999 |
| C3–C8 | >99.999 |
| C3–C8–C10 | >99.999 |
| C8–C10 | >99.999 |

EXAMPLE #2

Ten whole chicken carcasses were inoculated with *Salmonella typhimurium* (Nalidixic acid resistant strain) and Escherichia coli (*E. coli*) cultures. The carcasses were inoculated by first preparing stock solutions of approximately 30 milliliters (ml) each of *Salmonella typhimurium* and *E. coli* in saline at a Macfarland #3 microorganism level (30 million organisms per cubic centimeter). 10 ml each of the *Salmonella typhimurium* and *E. coli* stock solutions were then added to 2.5 gallons of saline to form a first inoculating solution. A second inoculating solution was formed in the same manner as the first inoculating solution. Five whole eviscerated chicken carcasses comprising the treatment group were allowed to soak in the first inoculating solution for 30 minutes. Five whole chicken carcasses comprising a control group were allowed to soak in the second inoculating solution for 30 minutes. The five carcasses comprising the treatment group were retrieved, drained and transferred to a barrel (Barrel #1) containing a bacteriocidal solution at room temperature. The five carcasses comprising the control group were similarly retrieved, drained and transferred to a barrel containing a control solution identified below and at room temperature.

The bacteriocidal solution was prepared from a concentrate solution comprising sixty percent acetic acid, five percent hydrochloric acid, five percent propionic acid, ten percent citric acid, ten percent water and ten percent fatty acids by weight. Sixty percent of the fatty acids (six percent of the concentrate solution) were capric acid (eight carbon atoms) and forty percent of the fatty acids (four percent of the concentrate solution) were capric acid (ten carbon atoms). 0.444 ml of the concentrate solution were added to twenty gallons of de-ionized water to prepare the bacteriocidal solution. The concentration of fatty acids in the bacteriocidal solution was approximately 586 parts per million (ppm). The control solution was 20 gallons of de-ionized water.

The inoculated chicken carcasses in the bacteriocidal solution and the control solution were then agitated for thirty minutes at room temperature. The carcasses were then removed from the bacteriocidal solution and the control solution and drained. The carcasses were evaluated for bacterial contamination by individually shaking each carcass for one minute in a bag with a rinse solution comprising 100 ml of sterile water. The rinse solution was then poured back into sterile vials and diluted from 10(−1) to 10(−8) using 9.0 ml peptone blanks and plate on TPC (Total Plate Count) Petrifilm. The TPC petrifilm was read and recorded after 48 hours. Appropriate volumes of 10 times normal concentration selenite cystine broth (10X SCB) were then added and allowed to incubate overnight. After 24 hours of incubation of SCB, each vile was streaked on XLD (xylosinedicarboxylate) with 100 ppm Nalidixic acid. After 24 hours indications of whether Salmonella was present(+) or absent(−) was read directly from the Nalidixic acid XLD plates. The results are shown in Table 2.

TABLE #2

|  | TPC (CFU/ML)* | Salmonella |
| --- | --- | --- |
| Control Carcasses |  |  |
| Control #1 | 6,300 | (+) |
| Control #2 | 11,000 | (+) |
| Control #3 | 10,000 | (+) |
| Control #4 | 6,000 | (+) |
| Control #5 | 5,900 | (+) |
| Treated Carcasses |  |  |
| Treated #1 | <10 | (−) |
| Treated #2 | <10 | (−) |
| Treated #3 | <10 | (−) |
| Treated #4 | <10 | (−) |
| Treated #5 | <10 | (−) |

*CFR = Colony Forming Units, ML - milliliters

EXAMPLE #3

The procedure disclosed in Example #2 above was repeated with 25 more chicken carcasses with changes in procedure as noted below. After inoculation, five of the carcasses were placed in a control solution similar to that in Example #2 but at 10° Centigrade (C.), five carcasses were placed in a Barrel #2 containing the bacteriocidal solution as disclosed in Example #2 diluted to 50 ppm fatty acids, five carcasses were placed in a Barrel #3 containing the bacteriocidal solution as disclosed in Example #2 diluted to 100 ppm fatty acids, five carcasses were placed in a Barrel #4 containing the bacteriocidal solution as disclosed in Example #2 diluted to 250 ppm fatty acids, and five carcasses were placed in a Barrel #5 containing the bacteriocidal solution as disclosed in Example #2. The temperature of bacteriocidal solutions was maintained at 10° C. The results are shown in Table #3.

TABLE #3

Treatment of Innoculated Carcasses in Sanitizing Solutions at 10° C.

|  | TPC (CFU/ML) | Salmonella |
| --- | --- | --- |
| Control Carcasses |  |  |
| Control #1 | 5,900 | (+) |
| Control #2 | 8,900 | (+) |
| Control #3 | 9,500 | (+) |
| Control #4 | 10,600 | (+) |
| Control #5 | 11,200 | (+) |
| Barrel #2 Treated Carcasses (50 PPM) |  |  |
| Treated #1 | 16,200 | (+) |
| Treated #2 | 8,100 | (+) |
| Treated #3 | 6,200 | (+) |
| Treated #4 | 7,200 | (+) |
| Treated #5 | 5,400 | (+) |
| Barrel #3 Treated Carcasses (100 PPM) |  |  |
| Treated #1 | 12,200 | (+) |
| Treated #2 | 6,200 | (+) |
| Treated #3 | 9,300 | (+) |

TABLE #3-continued

Treatment of Innoculated Carcasses
in Sanitizing Solutions at 10° C.

|  | TPC (CFU/ML) | Salmonella |
|---|---|---|
| Treated #4 | 7,300 | (+) |
| Treated #5 | 5,400 | (+) |
| Barrel #4 Treated Carcasses (250 PPM) | | |
| Treated #1 | 2,800 | (+) |
| Treated #2 | 4,400 | (+) |
| Treated #3 | 1,200 | (+) |
| Treated #4 | 4,400 | (+) |
| Treated #5 | 3,300 | (+) |
| Barrel #5 Treated Carcasses (500 PPM) | | |
| Treated #1 | 3,700 | (+) |
| Treated #2 | 20 | (+) |
| Treated #3 | 370 | (+) |
| Treated #4 | <10 | (+) |
| Treated #5 | <10 | (+) |

EXAMPLE #4

A sanitizing solution was prepared by diluting a sanitizing solution concentrate comprising 50 grams acetic acid, 10 grams caprylic acid (eight carbon atoms), 10 grams citric acid, 5 grams hydrochloric acid and 25 grams water with enough water to reduce the concentration of caprylic acid to 490 ppm. Thirty five chicken drumettes were soaked in a solution containing a mixture of *Salmonella enerididis* and *Salmonella typhimurium* at a concentration equal to 50,000 bacteria per milliliter for 30 minutes at room temperature. Fifteen of these drumettes or inoculated controls were placed in a lactose broth without treatment with the sanitizing solution. The remaining twenty drumettes or treatment drumettes were immersed in the sanitizing solution at room temperature for 30 minutes during which time the sanitizing solution was agitated. These twenty drumettes were then placed in a lactose broth. Five drumettes or untreated controls were placed in a lactose broth without inoculation in the Salmonella mixture or treatment with the sanitizing solution. The drumettes were incubated in the lactose broth for 24 hours. After the 24 hour incubation, one ml was take from the broth in which each drumette soaked and place in 10 mls of tetrathionate broth and in 10 mls selenite cystine broth. The tetrathionate and selenite cystine broths were then incubated for 16 hours. One ml of each sample was then transferred to a 10 ml tube of GN broth and incubated for an additional 6 hours. The samples were then analyzed using the Gene Trak system. All the untreated controls tested positive for Salmonella. Thirteen out of the fifteen inoculated controls tested positive for Salmonella. Nineteen out of the twenty treated drumettes (95%) tested negative for Salmonella.

EXAMPLE #5

The procedure as disclosed in Example #2 was repeated for an additional ten whole eviscerated carcasses except that the bacteriocidal solution was diluted to 650 ppm fatty acids. The carcasses were immersed for 30 minutes at room temperature. The results are shown in Table #5.

TABLE #5

|  | CONTROL SOLUTION | BACTERIOCIDAL SOLUTION |
|---|---|---|
| TOTAL PLATE COUNT | 44,000–62,000 | LESS THAN 10 |
| COLIFORMS | 4,400–7,800 | LESS THAN 10 |
| ESCHERICHIA COLI | 5,100–7,800 | LESS THAN 10 |
| SALMONELLA | POSITIVE | ALL NEGATIVE |

EXAMPLE #6

Five sets of five uninoculated chicken wings were treated with either a control solution or one of four concentrations of a bacteriocidal spray solution. The control solution comprises water. A first bacteriocidal spray solution comprises 0.5 percent fatty acids, 10 percent citric acid, enough hydrochloric acid to lower the Ph of the solution to 2.5, 0.5 percent xanthan gum and the rest water. The concentration of fatty acids was increased to 1.0 percent in a second bacteriocidal spray solution, 2.0 percent in a third bacteriocidal spray solution, and 4.0 percent in a fourth bacteriocidal spray solution. The fatty acids comprise 60 percent Caprylic acid and 40 percent Capric acid. Concentrations are weight percents.

The bacteriocidal spray solutions were agitated by stirring to form an emulsion of the fatty acids in water. Each of the bacteriocidal spray solutions and the control solution were then sprayed on five separate chicken wings. The bacteriocidal spray solutions and the control solution were left on the carcasses for ten minutes and then the carcasses were rinsed for one hour in cold water to simulate a chill tank. The wings were then cultured. The results are shown in Table 6.

TABLE #6

| Solution (Fatty Acid Concentration) | Average Total Plate Count After Treatment |
|---|---|
| Control (Water) | 382 CFU/cm$^2$ |
| First Bacteriocidal Spray Solution (0.5%) | 182 CFU/cm$^2$ |
| Second Bacteriocidal Spray Solution (1.0%) | 146 CFU/cm$^2$ |
| Third Bacteriocidal Spray Solution (2.0%) | 234 CFU/cm$^2$ |
| Fourth Bacteriocidal Spray Solution (4.0%) | 134 CFU/cm$^2$ |

EXAMPLE #7

A culture of Salmonella typhimurium was grown to McFarland #1 density (10 million organisms per cubic centimeter) in one liter of lactose broth in order to artificially contaminate chicken parts. One liter of a 500 parts per million (ppm) fatty acid solution was prepared by diluting with water a concentrated fatty acid solution comprising 10 percent fatty acids, 60 percent acetic acid, 10 percent citric acid, 5 percent hydrochloric acid and 15 percent water. The fatty acids comprised 60 percent Caproic acid (six carbon atoms) and 40 percent Caprylic acid. One liter of isotonic saline and thirty one-hundred milliliter aliquots of lactose broth were also prepared.

Thirty freshly processed chicken drumettes were collected at a processing plant and separated into three groups of ten. One group was placed directly in lactose broth for Salmonella screening. Each of the ten drumettes in this group was placed in an individual plastic bottle containing one-hundred milliliters of sterile lactose broth. These were incubated 18 to 24 hours as the primary enrichment step for Salmonella screening. This group forms a natural baseline for the experiment.

A second group was placed in the prepared culture of Salmonella. The culture was at a temperature of 22° Centigrade (°C.). These were allowed to soak for thirty minutes and then transferred to one liter of isotonic saline at 22° C. After thirty minutes in the saline solution the drumettes were placed in individual bottles of lactose broth for Salmonella screening as with the first group. This group is the artificially contaminated untreated control for the experiment.

The third group was soaked in the Salmonella culture in the same manner as group two. This group was then soaked in a fatty acid solution for thirty minutes at a temperature of 22° C. The drumettes were removed from the fatty acid solution and placed in individual bottles of lactose broth as with the other groups. All thirty samples were cultured for Salmonella according to the Food and Drug Administration Biological Analytical Manual procedure. The use of caproic acid produced an unacceptably pungent and malodorous carcass. The results are shown in Table 7.

TABLE #7

| Group | No. Salmonella Positive | % Salmonella Positive |
|---|---|---|
| 1 | 0 | 0 |
| 2 | 10 | 100 |
| 3 | 6 | 60 |

EXAMPLE #8

Twenty chicken carcasses were weighed (ten for a control group and ten for a test group). The ten control carcasses were immersed in water at 130° Fahrenheit for five minutes, rinsed for 30 minutes in an ice bath and allowed to drain for 10 minutes. The control carcasses were reweighed and the weights were recorded.

The ten test carcasses were immersed in a bacteriocidal solution at 130° Fahrenheit for five minutes, rinsed for 30 minutes in an ice bath and allowed to drain for 10 minutes. The test carcasses were reweighed and the weights were recorded. The bacteriocidal solution was prepared from a concentrate solution comprising by weight sixty percent acetic acid, five percent hydrochloric acid, five percent propionic acid, ten percent citric acid, ten percent water and ten percent fatty acids. The fatty acids were sixty percent caprylic acid and forty percent capric acid. The concentrate solution was diluted to 675 parts fatty acids per million in water. The results are presented in Table 8.

TABLE #8

| | Weight Before (grams) | Weight After (grams) | Difference (grams) | % Gain |
|---|---|---|---|---|
| Controls | | | | |
| 1 | 519.1 | 531.4 | 12.3 | 2.4 |
| 2 | 566.8 | 579.0 | 12.2 | 2.2 |
| 3 | 577.8 | 587.6 | 9.8 | 1.7 |
| 4 | 562.4 | 573.8 | 11.8 | 2.1 |
| 5 | 623.9 | 635.2 | 11.3 | 1.8 |
| 6 | 635.1 | 642.4 | 7.3 | 1.1 |
| 7 | 601.7 | 619.8 | 7.3 | 1.2 |
| 8 | 667.1 | 679.2 | 12.1 | 1.8 |
| 9 | 676.6 | 689.4 | 12.8 | 1.9 |
| 10 | 491.9 | 499.4 | 7.5 | 1.5 |
| Tests | | | | |
| 11 | 533.2 | 570.1 | 36.9 | 6.9 |
| 12 | 588.7 | 618.7 | 30.0 | 5.1 |
| 13 | 576.2 | 612.6 | 36.4 | 6.3 |
| 14 | 533.0 | 573.9 | 40.9 | 7.7 |
| 15 | 533.3 | 567.2 | 33.9 | 6.4 |
| 16 | 581.7 | 614.7 | 33.0 | 5.7 |
| 17 | 523.1 | 552.4 | 29.3 | 5.6 |
| 18 | 697.4 | 736.5 | 39.1 | 5.6 |
| 19 | 642.2 | 667.2 | 25.0 | 4.6 |
| 20 | 569.1 | 601.0 | 31.9 | 5.6 |

It is to be understood that while certain forms of the present invention have been illustrated and described herein, it is not to be limited to the specific forms or arrangement of parts described and shown.

What is claimed and desired to be secured by Letters Patent is as follows:

1. An animal carcass sanitizing solution composition for treating an animal carcass to eradicate bacteria from the carcass wherein:
   (a) said composition is substantially surfactant and sodium salt free and said composition comprises:
   (b) a quantity of water;
   (c) an amount of a medium chain fatty acid suitable for consumption by a human which is soluble in said quantity of water and wherein the concentration of fatty acid in said quantity of water is bacteriocidally effective; and
   (d) a sufficient amount of an acid suitable for consumption by a human is utilized to maintain the composition at an acid pH.

2. A sanitizing solution composition for treating an animal carcass to eradicate bacteria from the carcass wherein:
   (a) said composition is substantially surfactant free and comprises:
   (b) a quantity of water;
   (c) an amount of a medium chain fatty acid suitable for consumption by a human which is soluble in said quantity of water and wherein the concentration of fatty acid in said quantity of water is bacteriocidally effective;
   (d) a sufficient amount of an acid suitable for consumption by a human is utilized to maintain the composition at an acid pH; and
   (e) a thickening agent.

3. The composition as disclosed in claim 2 wherein:
   (a) said medium chain fatty acid is selected from the group of fatty acids having from six to twelve carbon atoms per molecule and mixtures thereof.

4. The composition as disclosed in claim 3 wherein:
   (a) said fatty acid is selected from the group consisting essentially of caprylic acid, capric acid and mixtures thereof.

5. The composition as disclosed in claim 1 further comprising:
   (a) a chelating agent.

6. The composition as disclosed in claim 5 wherein:
   (a) said chelating agent comprises citric acid.

7. The composition as disclosed in claim 5 wherein:
   (a) said chelating agent comprises polyphosphoric acid.

8. The composition as disclosed in claim 5 wherein:
   (a) said chelating agent comprises phosphoric acid.

9. The composition as disclosed in claim 1 wherein:
   (a) said thickening agent comprises an effective amount of a polysaccharide.

10. The composition as disclosed in claim 1 wherein:
    (a) said acid for maintaining the composition at an acid pH comprises hydrochloric acid.

11. The composition as disclosed in claim 1 wherein:
    (a) said acid for maintaining the composition at an acid pH comprises phosphoric acid.

12. The composition as disclosed in claim 1 wherein:
    (a) said acid for maintaining the composition at an acid pH comprises citric acid.

13. The composition as disclosed in claim 1 wherein:
    (a) the concentration of medium chain fatty acids in said composition ranges from fifty to one thousand five hundred parts per million.

* * * * *